Aug. 6, 1940.   J. L. BROWN   2,210,705
AXIAL SHAFT ADJUSTMENT FOR DYNAMOELECTRIC MACHINES
Filed Sept. 14, 1938

WITNESSES:
E. F. Oberheim.
F. P. Lyle.

INVENTOR
John L. Brown.
BY O. B. Buchanan
ATTORNEY

Patented Aug. 6, 1940

2,210,705

UNITED STATES PATENT OFFICE 2,210,705

AXIAL SHAFT ADJUSTMENT FOR DYNAMO-ELECTRIC MACHINES

John L. Brown, Verona, Pa., assignor to Westinghouse Electric & Manufacturing Company, East Pittsburgh, Pa., a corporation of Pennsylvania Application September 14, 1938, Serial No. 229,831

2 Claims. (Cl. 308—189)

The present invention relates to dynamoelectric machines, and, more particularly, to means for axially adjusting the rotor shafts of such machines.

There are many applications of electric motors in which it is desirable to make axial adjustments of the shaft from time to time. For example, when an electric motor is used to drive a pump, the pump runner or impeller is often mounted directly on the motor shaft. It is necessary occasionally to adjust the position of the pump runner with respect to its housing, and this may be most conveniently done by adjusting the shaft of the motor. Such adjustment must be quite accurate, since the clearances between the pump runner and housing are often very small. Motors used for such service are frequently of the totally enclosed type and an additional requirement therefore is that the adjusting means must be accessible from outside of the motor housing.

The object of the present invention is to provide a simple but very accurate means for axially adjusting the rotor shaft of an electric motor.

A further object is to provide an axial shaft adjusting means which is accessible from outside the motor housing, and in which the adjustment can be made without exposing the bearing or permitting the escape of lubricant from it.

A still further object is to provide an adjusting means which can be easily applied to a motor bracket of standard design with a minimum of extra machining.

Figure 1:
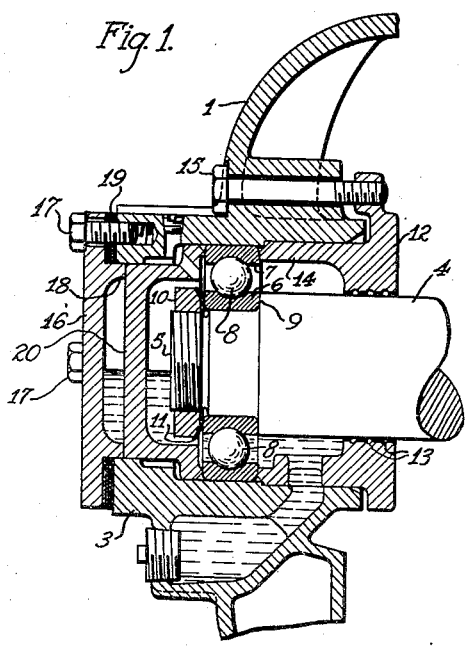
Figure 2:
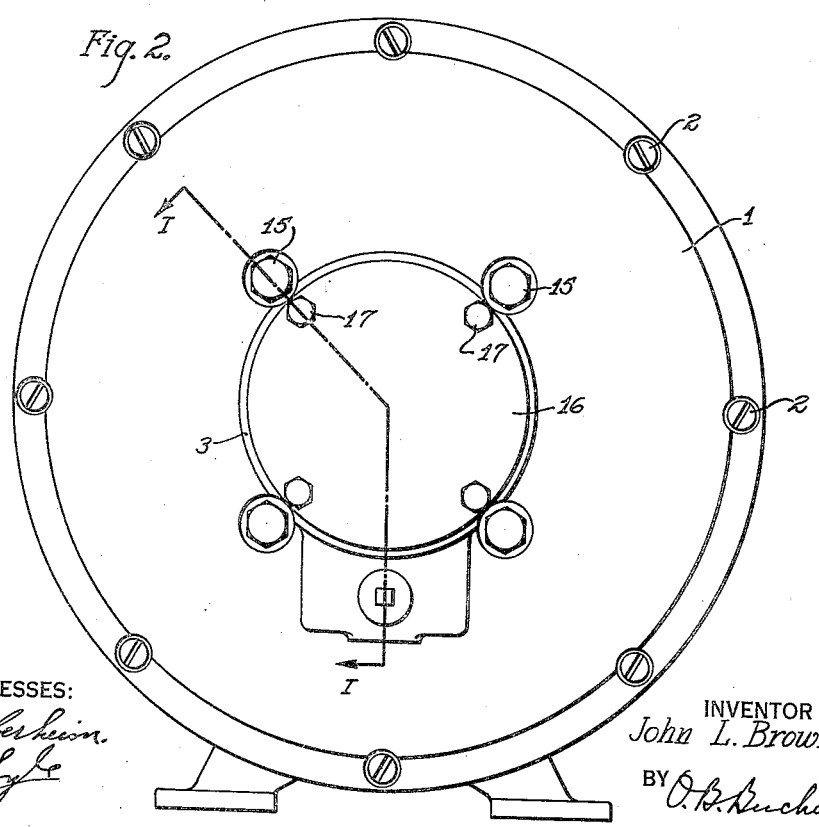

Other objects and advantages will be apparent from the following detailed description taken in connection with the accompanying drawing, in which:

Figure 1 is a fragmentary longitudinal section of the end bracket of a motor taken approximately on the line I—I of Fig. 2, and Fig. 2 is an end view of a totally enclosed electric motor.

The invention is shown in the drawing as applied to a totally enclosed motor having an end bracket 1 of any suitable type secured to the frame of the motor by bolts 2. The motor frame and bracket may be of any usual design, since the adjusting means of the present invention is adapted to be applied to any standard motor bracket. The adjusting means is provided at one end of the motor only, and any usual bearing construction may be used at the other end.

As shown in Fig. 1, the bracket 1 has a central hub portion 3 which is formed with a bore to receive the bearing. The motor has a shaft 4 on which a rotor of any suitable type is mounted, and the shaft has a reduced, threaded portion 5 at its end. An anti-friction bearing is provided for the shaft consisting of inner and outer races 6 and 7, respectively, and an annular row of balls 8. The inner race 6 is clamped against a shoulder 9 on the shaft by means of a nut 10 and lock washer 11, threaded on the reduced portion 5 of the shaft, so that the bearing is rigidly secured to the shaft and movable with it.

On the inside of the bracket an inner cap member 12 is provided which closely encircles the shaft 4 and has grooves 13 formed in it for the reception of suitable sealing means to prevent leakage of lubricant from the bearing along the shaft. This cap member has an axially extending annular flange 14 which is adapted to fit into the bore of the hub 3 and engage the outer race 7 of the bearing. The cap member is held in position by screws 15 which extend through the bracket 1 and are threaded into holes formed in ears on the outer periphery of the cap member 12.

On the outside of the bracket there is provided an adjusting plate or outer cap member 16 which is releasably secured to the hub 3 by means of screws 17. The outer cap 16 has an inwardly extending flange 18 which fits into the bore of the hub 3 and forms an abutment to limit movement of the bearing and associated parts outwardly of the bracket. In order to adjust the axial position of the cap member 16 with respect to the bracket, a plurality of removable shims 19 are clamped between the cap member and the outer face of the hub.

A generally cup-shaped retainer 20 is placed inside the cap member 16 and encloses the outer end of the bearing in order to prevent the escape of lubricant from the bearing, or the entrance of dirt into the bearing when the outer cap 16 is removed. The inner edge of this retainer engages the outer race 7 of the bearing, and its outer face engages the flange 18 of the cap member 16. Thus, when the screws 17 and 15 are tightened, the outer bearing race and the retainer 20 are tightly clamped in position between the inner and outer cap members.

To adjust the axial position of the shaft 4, the outer cap member 16 is removed and the screws 15 are loosened. One or more of the shims 19 are then removed or inserted, depending on the desired direction of adjustment, and the cap member 16 is replaced and the screws 17 tightened. The screws 15 are then tightened to move the cap member 12 into engagement with the bearing and clamp the bearing and retainer tightly against the cap 16. It will be seen that the flange 18 of the cap 16 acts as an abutment to determine the position of the retainer 20 and bearing and that the inner cap member serves to move the bearing and retainer against this abutment and to clamp them in position. It will also be noted that since the screws 15 extend through the bracket, they are accessible from the outside of the motor, and that the desired adjustment can readily be made without any disassembly of the motor itself.

This adjusting means can be readily applied to any standard design of motor bracket, since it is not necessary to make any change on the interior of the bracket, and the only extra machining necessary is boring the hub 3 to the proper dimensions to receive the cap and retainer members, and the provision of holes for the screws 15 and 17.

Various modifications of the adjusting means described above are possible to adapt it to motors of different types and for different purposes. Thus, if desired, a shaft extension can be provided for merely by boring suitable holes in the retainer 20 and cap member 16 through which the shaft may extend. This, of course, does not affect in any way the operation of the device. This device can also be applied, without material modification, to other types of bearing. Thus, for example, a double row ball bearing might be used merely by shortening the flange 14 to make room for the increased length of the bearing. This arrangement can also conveniently be used as a means for taking up end play in a motor shaft, where adjustability is not the primary consideration.

It will be seen, therefore, that an axial shaft adjusting means has been provided which is of very simple construction and can readily be applied to standard motor brackets, but which is capable of providing very accurate adjustment. It is to be understood that although a specific embodiment of the invention has been shown and described, it is not limited to the exact details of construction shown, but, in its broadest aspects, it includes all equivalent modifications and embodiments which come within the scope of the appended claims.

I claim as my invention:

1. An electric motor comprising a housing having end brackets secured thereto, a shaft, antifriction bearings secured to the shaft and supported in the end brackets, and means for adjusting the shaft axially, said means comprising an outer cap member releasably secured to the outside of one of the end brackets, means for determining the axial position of the cap member relative to the bracket, said means being accessible when the cap member is removed from the bracket, a generally cup-shaped retainer member enclosing the outer end of the bearing, said outer cap member being adapted to engage the outer surface of the retainer member, an inner cap member engaging the inner end of the bearing inside the bracket and means accessible from the outside of the bracket for drawing the inner cap member against the bearing and clamping the bearing and retainer member against the outer cap member.

2. An electric motor comprising a housing having end brackets secured thereto, a shaft, antifriction bearings secured to the shaft and supported in the end brackets, and means for adjusting the shaft axially, said means comprising an outer cap member releasably secured to the outside of one of the end brackets, a plurality of removable shims between the cap member and the bracket for adjusting the axial position of the cap member relative to the bracket, a generally cup-shaped retainer member enclosing the outer end of the bearing, said outer cap member being adapted to contact the outer surface of the retainer member to limit movement of the bearing outwardly of the bracket, an inner cap member encircling the shaft on the inside of the bracket and adapted to engage the inner end of the bearing, and a plurality of bolts extending through the bracket and threaded in the inner cap member for drawing it against the bearing and clamping the bearing and retainer member against the outer cap member.

JOHN L. BROWN.